May 26, 1931. R. R. SEARLES 1,807,093
ANTIFRICTION SPRING CONNECTION
Original Filed Jan. 29, 1925
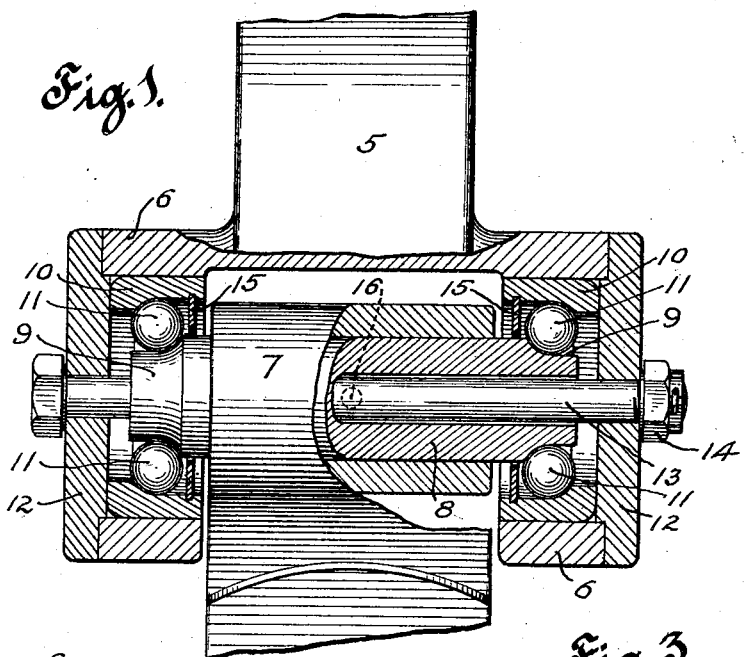
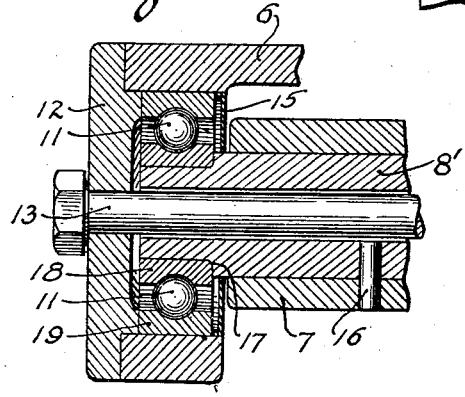
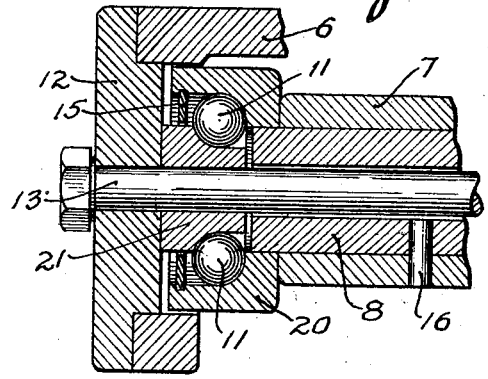
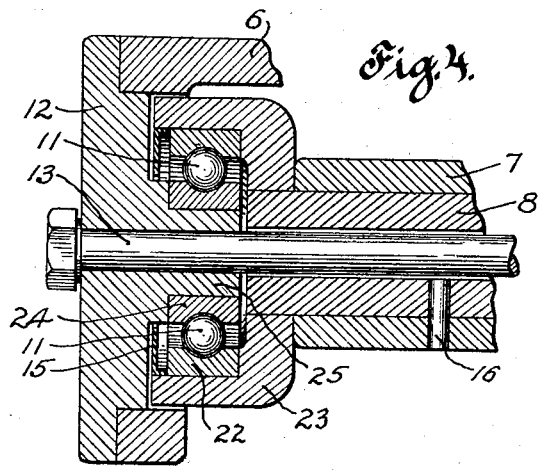
INVENTOR
Raymond R. Searles
BY
ATTORNEYS Patented May 26, 1931

1,807,093

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

ANTIFRICTION SPRING CONNECTION

Application filed January 29, 1925, Serial No. 5,623. Renewed October 7, 1930.

My invention relates to a spring end connection for a vehicle.

It is the principal object of my invention to provide an anti-friction spring end connection which will be simple in construction and serviceable in use.

It is another object to provide an improved spring end connection in which parts may be made readily interchangeable, and assembly greatly facilitated.

It is a further object, to provide a spring end connection in which the parts are held in operative position by means of a single through bolt. Other objects will appear as the specification proceeds.

In the drawings forming part of this specification are shown illustrative forms of the invention. In said drawings, Fig. 1 is an end view in partial section of a spring end connection embodying features of my invention.

Fig. 2 is a fragmentary sectional view of a slightly modified form.

Fig. 3 is a view similar to Fig. 2, of still another modification.

Fig. 4 is a view similar to Fig. 3 but illustrating another modification.

In the drawings 5 indicates a part of the frame of a vehicle. Bosses 6—6 are provided and in the form shown are integrally formed with the frame and extend laterally from opposite sides thereof. Each boss is bored out so as to form a recess for a purpose to be later described. These bosses 6—6 are spaced apart a distance sufficient to permit the introduction of the spring end 7 which extends between the bosses and is supported in such position by means to be described.

8 indicates a bearing pin or journal which is provided with a bore centrally therethrough. In the specific form shown in Fig. 1 the pin 8 is reduced at the ends as indicated at 9—9, and anti-friction raceways are formed directly upon these reduced ends. If desired, outer anti-friction raceways or rings 10—10 may be seated in the recesses in the bosses and with the bearing surfaces 9—9 constitute complementary raceways for the reception of anti-friction bearing members such as balls 11—11. In the form shown in Fig. 1, the raceways are slightly inclined to each other so as to cause the balls to take both radial and thrust loads.

The outer ends of the recesses in the bosses 6—6 may be closed by cover members or caps 12—12 fitting over the ends of the bosses and in the form shown having projecting portions extending into the respective recesses and engaging the race rings 10—10 for holding the same in place against the bearing members 11—11. A member, which may be termed a through bolt 13, extends through the cover members 12—12 and through the central bore in the bearing pin 8 and the nut 14 when drawn up secures the cover members in place and serves to hold the anti-friction spring end connection in assembled and adjusted relation.

It will be seen that with the construction as described the spring itself need not touch the vehicle frame directly but is supported therefrom by means of the bearing members or balls 11—11 which take both radial and thrust loads.

In order to exclude dust and to retain lubricant in the space adjacent the bearing members 11—11, I may provide a dust ring or closure 15 inwardly of the balls so as to properly close the inner ends of the respective recesses in the frame bosses.

It is desirable that the bearing pin 8 be rigidly secured within the spring eye and this may be accomplished by shrinking or, if desired, a pin 16 may be passed through the spring eye and into the bearing pin.

In the form of the invention shown in Fig. 2 the end of the shaft 8' is reduced and rather abruptly shouldered as indicated at 17 and an inner bearing ring 18 is fitted on this reduced pin end. In this form of the invention the inner ring 18 and the outer ring 19 seated in the recess in the boss are grooved so as to form the races of a conventional radial ball bearing. As in the preceding form the outer ring 19 is engaged by the cover member 12 and since rather deep grooves are provided in the race rings the bearing will take both radial and thrust loads. The mode of operation of this form of the invention is substantially the same as that previously described.

In the form disclosed in Fig. 3 the tubular pin 8 is not quite as long as in the two previous forms and does not extend quite so far into the recesses in the bosses such as 6. In this specific example an outer bearing ring 20 is secured to the end of the pin 8 while an inner ring or cone 21 is engaged by a cover member 12 and fits the through bolt 13 rather snugly. In this case, as with the form shown in Fig. 1, the bearing takes both radial and thrust loads and the bolt 13 serves to hold the various parts in adjusted and assembled relation.

In the modification disclosed in Fig. 4 the construction is quite similar to that illustrated in Fig. 3 except that a separate outer race ring 22 is placed inside of the cup or ring 23 which is secured on the end of the pin 8 instead of having the raceway formed directly on the cup or ring as in Fig. 3. In Fig. 4 an inner race ring 24 fits over a projection 25 on the cover member 12 and the rings 22—24 may be rather deeply grooved so that with the interposed balls 11—11 both radial and thrust loads are taken. In this case also the cover member 12 engages one of the rings, in this case the inner ring, and serves to hold the same in place. The through bolt 13 holds all of the members in adjusted and assembled relation.

It will, of course, be obvious without specific mention, that in each of the forms shown in Figs. 2, 3, and 4 a second bearing, similar to those shown, would be provided for the side of the spring opposite to that shown.

It is to be observed that in those particular forms of the invention illustrated in the drawings, the end members or cover means 12 at opposite sides of the frame are definitely spaced apart a single definite distance by engagement with the sides of the frame. The holding means such as the bolt 13 serves to rigidly secure the cover means 12 in such definite spaced relation. Since one of the antifriction bearing means of each pair at each side of the frame abuts the adjacent cover member 12, the raceway portions of these bearing means are correspondingly definitely spaced apart a definite distance in one direction. The other or complementary raceway means may also be readily spaced apart a definite distance in one or, when a single pin as disclosed in Fig. 1 is employed, in both directions. Spring end connections as herein disclosed may be produced under factory supervision, and by proper finishing the parts may all be made to fit with the desired degree of exactness when the securing means such as the bolt 13 is drawn up to its maximum extent. All parts, therefore, may be readily made interchangeable, and when the parts are being assembled no adjustments are necessary, and by merely securing the abutment means 12—12 in place the assembly is completed, and the antifriction bearing members such as the balls 11 engage their respective raceways with just the desired fit. By making the parts interchangeable and providing for the desired fit of all parts without adjustment, quantity production is facilitated.

While the invention has been described in detail, and several modifications disclosed, I do not wish to be confined to the forms shown since many modifications may be made within the scope of the invention as defined in the appended claims.

I claim:

1. In a spring connection, a frame having spaced apart bosses, said bosses having bores therein, pin means to be secured to a spring between said bosses, said pin means having antifriction bearing member raceways at opposite sides of said spring and spaced a single definite minimum distance apart, end caps for closing the outer ends of said bores in said bosses and extending over the outer ends of said pin means, said end caps being in abutting relation to and being spaced a definite minimum distance apart by said bosses, means for rigidly securing said end caps to said bosses so spaced apart, antifriction bearing member raceways in abutting relation to and spaced a definite maximum distance apart by said end caps, and antifriction bearing members interposed between said last mentioned raceways and the complementary raceways of said pin means.

2. In a spring connection for connecting a frame and spring, one of said parts having spaced apart bosses with bores therein, the other of said parts having antifriction bearing member raceways spaced a definite minimum distance apart, end caps for closing the outer ends of said bores in said bosses and supported by said bosses a definite minimum distance apart, means for securing said end caps to said bosses so spaced apart, antifriction bearing members on said raceways, complementary antifriction bearing raceways coacting with said antifriction bearing members and spaced a single definite maximum distance apart by said end caps.

3. In a spring connection for connecting a frame and spring, one of said members having spaced apart bosses with bores therein, the other of said members having antifriction bearing member raceways spaced a single definite minimum distance apart, antifriction bearing members on said raceways, end caps for closing the outer ends of said bores, said end caps being spaced a single definite minimum distance apart by said bosses, antifriction bearing member raceways engaging said antifriction bearing members and spaced a single definite maximum distance apart by said end caps, and a single through bolt for rigidly securing said end caps so definitely spaced apart by said bosses.

4. In a spring connection for connecting a frame and spring, one of said parts having spaced apart bosses with bores therein, the other of said parts having tubular pin means with bearing raceways thereon spaced a single definite minimum distance apart, anti-friction bearing members on said raceways, complementary raceways in said bores and engaging said antifriction bearing members, end caps engaging said bosses and thereby spaced apart a single definite minimum distance, said end caps engaging the raceways in said bores to thereby space the same a single definite maximum distance apart, and a through bolt extending through said tubular pin means and securing said end caps to each other and to said bosses.

5. In a spring connection for connecting a spring part and frame part, one of said parts having anti-friction bearing member raceways spaced a single definite minimum distance apart, the other of said parts having anti-friction bearing member raceways complementary to said first mentioned raceways and spaced a single definite distance apart, and anti-friction bearing members interposed between said complementary raceways.

6. In a spring connection for connecting a spring part and frame part, one of said parts having bosses with bores therein, bearing raceways fitting said bores and supported thereby, end members for said bores and secured to said bosses, said raceways being in engagement with said end members and spaced thereby a single maximum distance apart, the other of said parts having raceway means complementary to said first mentioned raceways and spaced a single minimum distance apart, and anti-friction bearing members interposed between said complementary raceways.

7. In a spring connection for connecting a spring part and frame part, one of said parts having bosses with bores therein, bearing raceways fitting said bores and supported thereby, end members for said bores and secured to said bosses, said raceways being in engagement with said end members and spaced thereby a single maximum distance apart, the other of said parts having pin means with raceways formed directly thereon and being complementary to said first mentioned raceways and spaced a single minimum distance apart, and anti-friction bearing members interposed between said complementary raceways.

8. In a spring connection for connecting a frame part and spring part, one of said parts having spaced apart bosses, end members for said bosses, said end members having inner anti-friction bearing member raceways thereon spaced a single maximum distance apart, the other of said parts having outer anti-friction bearing member raceways complementary to said inner raceways and spaced a single minimum distance apart, and anti-friction bearing members interposed between said complementary raceways.

9. In a spring connection for connecting a frame part and spring part, one of said parts having spaced apart bosses, end members secured to said bosses, anti-friction bearing member raceways bodily carried by said end members and spaced thereby a definite maximum distance apart, the other of said parts having anti-friction bearing member raceways spaced a single minimum distance apart and complementary to said first mentioned raceways, and anti-friction bearing members interposed between said complementary raceways.

10. In a spring connection for connecting a spring part and frame part, one of said parts having bosses, end members for said bosses, means for securing said end members to said bosses, anti-friction bearing member raceways supported radially by said means, the other of said parts having anti-friction bearing member raceways complementary to said first mentioned raceways, and anti-friction bearing members interposed between said complementary raceways.

11. In a spring connection for connecting a spring part and a frame part, one of said parts having spaced apart bosses with bores therein, end caps for said bores and secured thereto, said end caps having parts extending into said bores, anti-friction bearing member raceways abutting parts of said end caps and being spaced thereby a single maximum distance apart, the other of said parts having anti-friction bearing member raceways complementary to said first mentioned raceways and spaced a single minimum distance apart, anti-friction bearing members interposed between said complementary raceways, one raceway of each complementary pair of raceways being immediately separable from its complementary raceway upon removal of said end caps.

12. In a spring connection for connecting a spring part and a frame part, one of said parts having spaced apart bosses with bores therein, end caps for said bores and secured thereto, anti-friction bearing member raceways abutting parts of said end caps and being spaced thereby a single maximum distance apart, the other of said parts having anti-friction bearing member raceways complementary to said first mentioned raceways and spaced a single minimum distance apart, anti-friction bearing members interposed between said complementary raceways, one raceway of each complementary pair of raceways being immediately separable from its complementary raceway upon removal of said end caps.

13. In a spring connection for connecting a frame part and spring part, one of said parts having spaced apart bosses with bores therein, end caps for said bosses and secured thereto, anti-friction bearing member raceways abutting said end caps and spaced thereby a single maximum distance apart, the other of said parts having anti-friction bearing member raceways complementary to said first mentioned raceways and spaced a single minimum distance apart, and anti-friction bearing members interposed between said complementary raceways, at least one raceway of each pair of complementary raceways being of tapered form to take thrust in only one direction whereby said complementary raceways may be assembled and disassembled by relative endwise movement.

14. In a spring connection for connecting a spring to another member, a hollow pin to be received in a spring eye and having raceways for anti-friction bearing members at opposite sides of the eye, end caps having raceways for anti-friction bearing members and complementary to said first mentioned raceways, anti-friction bearing members interposed between said complementary raceways, and a through bolt extending through said hollow pin for securing said end caps to each other, said end caps being spaced apart by the member to be connected to the spring.

15. In a device of the character indicated for hingedly connecting two members, means to be carried by one of said members and having raceways for anti-friction bearing members, end caps to be secured to the other of said members and having raceways complementary to said first mentioned raceways, anti-friction bearing members interposed between complementary raceways, and a through bolt concentric with said raceways for securing said end caps to each other and to said other of said members.

16. In a spring connection for hingedly connecting two members, one of said members having a bore therethrough, end caps for the ends of said bore, a through bolt for securing said end caps to each other and to said member having said bore, the other of said members having an eye surrounding said through bolt and interposed between said end caps, and bearing means surrounding said through bolt.

17. In a device of the character indicated for connecting two members of a spring connection, one of said members having end caps with raceways for anti-friction bearing elements, a through bolt for securing said end caps to said member and to each other, said end caps being spaced apart by said member, the other of said members having means with raceways for anti-friction bearing elements complementary to said first mentioned raceways, said means surrounding said through bolt, and anti-friction bearing elements interposed between said complementary raceways.

18. In a device of the character indicated for connecting two members of a spring connection, said members having concentric aligned bores therein, the bore in one of said members being interrupted to admit the other of said members, end caps for the bore in one of said members, a through bolt for connecting said end caps and securing the same to said last mentioned member, and anti-friction bearing means concentric with said bores for supporting one of said members from the other.

RAYMOND R. SEARLES.